C. A. CRUIT.
HOG OILER.
APPLICATION FILED OCT. 27, 1915.

1,196,210. Patented Aug. 29, 1916.

Witnesses
Arthur K. Moore

Inventor
C. A. Cruit
By
Attorneys

UNITED STATES PATENT OFFICE.

CHARLES A. CRUIT, OF SHELBYVILLE, ILLINOIS.

HOG-OILER.

1,196,210. Specification of Letters Patent. Patented Aug. 29, 1916.

Application filed October 27, 1915. Serial No. 58,276.

*To all whom it may concern:*

Be it known that I, CHARLES A. CRUIT, a citizen of the United States, residing at Shelbyville, in the county of Shelby, State of Illinois, have invented certain new and useful Improvements in Hog-Oilers; and I do hereby declare the following to be a full, clear, and exact description of the invention, such as will enable others skilled in the art to which it appertains to make and use the same.

The present invention is directed to improvements in that type of devices commonly known as "hog oilers," and has for its object to so construct a device of this character that an animal when rubbing itself against the device will apply the insecticidal fluid to the parts of the body so as to rid the same of vermin.

A further object of the invention is to provide a device so constructed that the fluid will be first supplied to a drum, which in turn applies the fluid to the body of the animal as the animal rubs thereagainst.

A still further object of the invention is to provide a device of this type constructed in such a manner that the drum will be constantly supplied with the fluid.

A still further object of the invention is to provide a novel means for removably mounting the drum on the fluid containing tank. And still another object is to provide a tank for this purpose so constructed that the same can be embedded in the ground to prevent the animals from upsetting the tank when rubbing against the drum thereof.

Figure 1:
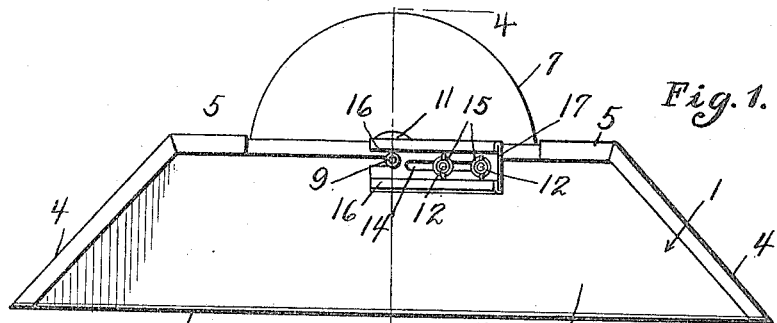
Figure 2:
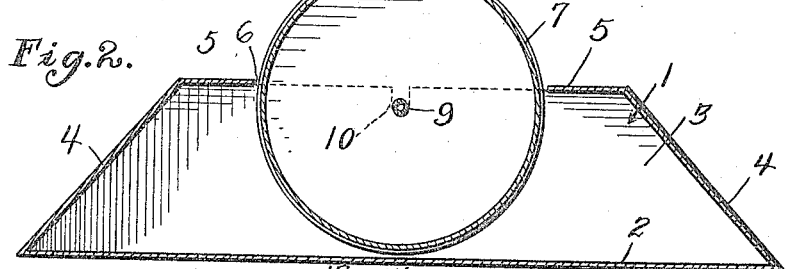
Figure 3:
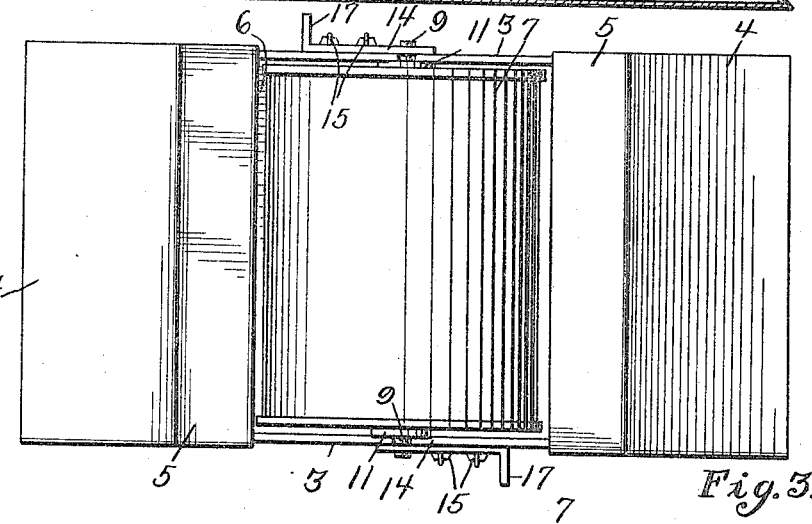
Figure 4:
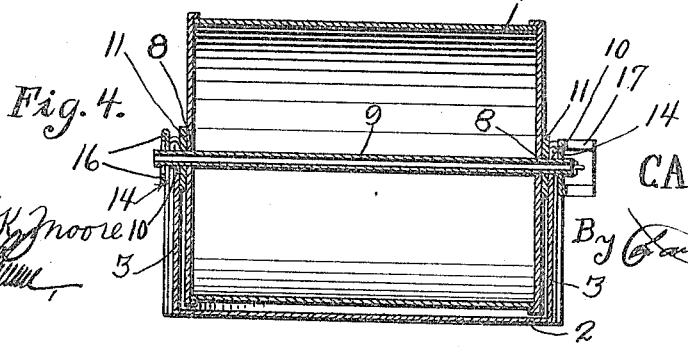

With these and other objects in view, this invention resides in the noval features of construction, formation, combination and arrangement of parts to be hereinafter more fully described, claimed and illustrated in the accompanying drawings, in which:

Figure 1 is a side elevation of the device. Fig. 2 is a longitudinal sectional view through the same. Fig. 3 is a top plan view. Fig. 4 is a sectional view on line 4—4 of Fig. 1.

Referring to the drawing 1 indicates the tank which is formed from sheet metal, and comprises a bottom 2, sides 3, downwardly inclined ends 4, and a top 5, said top having a transverse opening 6 formed therein to accommodate the drum 7, which is also formed from suitable sheet metal.

The drum 7 has its ends provided with openings 8 in which is engaged the tubular shaft 9, the ends of which project slightly beyond the ends of the drum for rotatably engaging the bearings 10 formed in the sides of the tank 1. To prevent moisture from entering the drum 7 washers 11 are passed over the projected ends of the shaft 9 and are soldered to the ends of the drum so as to effectually close the openings 8.

Fixed to the sides 3 of the tank are spaced bolts 12 which are adapted to slidably engage the slots 13 formed in the plates 14, said bolts having thumb nuts 15 engaged thereon for bindingly engaging the plates 14 to hold the same in adjusted position, said plates having one of their ends provided with furcations 16 which are adapted to engage the extended ends of the shaft 9 so as to prevent the same from accidentally disengaging the bearings 10, while the other ends of the plates are provided with flanges 17 to facilitate the operation of said plates.

By providing the inclined ends 4 it is obvious that when the tank is embedded in the earth that the ground line will be such as to prevent the tank from being dislodged, since the ends form, in effect, a wedge.

The fluid is poured through the openings 6 into the tank so that the drum 7 will at all times be partially submerged so that when the animal rubs thereagainst fluid will be applied.

What is claimed is:—

A hog oiler comprising a tank having downwardly inclined ends, the top of said tank having an opening formed therein, a drum arranged in the opening and having a shaft extending therethrough, bearings formed in the sides of the tank for rotatably engaging the ends of the shaft, horizontal plates slidably adjustable on the sides of the tank and having one of their ends provided with furcations for spanning the ends of the shaft to prevent accidental disengagement thereof from the bearings, the other ends of said plates being provided with flanges to facilitate the sliding thereof.

In testimony whereof I affix my signature, in the presence of two witnesses.

CHARLES A. CRUIT.

Witnesses:
O. W. WALKER,
WILL F. SCHLOBOHM.

Copies of this patent may be obtained for five cents each, by addressing the "Commissioner of Patents, Washington, D. C."